(12) United States Patent
Nakamura

(10) Patent No.: US 8,605,708 B2
(45) Date of Patent: Dec. 10, 2013

(54) SYSTEM, DEVICE AND METHOD FOR TDMA-BASED NETWORKING USING SPACE DIVISION MULTIPLEXED TRANSMISSIONS

(75) Inventor: Masaru Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 270 days.

(21) Appl. No.: 13/233,152

(22) Filed: Sep. 15, 2011

(65) Prior Publication Data
US 2012/0069835 A1    Mar. 22, 2012

(30) Foreign Application Priority Data

Sep. 16, 2010  (JP) ................................. 2010-207489
Jun. 15, 2011  (JP) ................................. 2011-133073

(51) Int. Cl.
*H04B 1/00* (2006.01)
(52) U.S. Cl.
USPC ........ 370/347; 370/294; 370/458; 455/404.2; 455/63.4; 455/101
(58) Field of Classification Search
USPC ......... 370/276, 277, 278, 282, 294, 296, 310, 370/312, 345, 347, 348, 442, 443, 458; 455/404.2, 456.1, 101, 25, 63.1, 63.4
See application file for complete search history.

(56) References Cited

U.S. PATENT DOCUMENTS

| 8,315,271 B2 * | 11/2012 | Nanda et al. ................... 370/450 |
| 2003/0214969 A1 * | 11/2003 | Cain et al. ...................... 370/443 |
| 2004/0152420 A1 * | 8/2004 | Redi et al. ................... 455/67.11 |
| 2007/0293237 A1 * | 12/2007 | Correal et al. ............. 455/456.1 |
| 2010/0182975 A1 | 7/2010 | Malladi et al. |
| 2010/0232538 A1 * | 9/2010 | Watanabe ..................... 375/267 |

FOREIGN PATENT DOCUMENTS

| JP | 3859140 | 9/2006 |
| JP | 3926669 | 3/2007 |
| JP | 4053265 | 12/2007 |
| JP | 2008-252709 | 10/2008 |
| JP | 2008-256640 | 10/2008 |
| JP | 4435039 | 1/2010 |
| JP | 2010-506505 | 2/2010 |
| WO | WO2008-042904 A2 | 4/2008 |

* cited by examiner

*Primary Examiner* — Michael Thier
*Assistant Examiner* — Curtis A Alia
(74) *Attorney, Agent, or Firm* — Cooper & Dunham LLP

(57) ABSTRACT

A wireless communication system includes wireless terminals. Each of the wireless terminals includes an SDM transmitting unit that includes antennas and generates directional radio signals to be transmitted to other terminals, each of which is obtained by superimposing radio signals at the antennas, each of which is composed of modulated data for each of the other terminals; a single-system receiving unit; and a TDMA control unit that controls a transmission of the SDM transmitting unit and a reception of the receiving unit in a time division manner. Using a TDMA scheme, the wireless terminals are controlled such that one of the wireless terminals acquires a transmission right for a predetermined time period to simultaneously transmit the generated directional radio signals from the SDM transmitting unit, while during the predetermined time period, the receiving units of the other wireless terminals having no transmission right simultaneously receive their corresponding directional radio signals.

16 Claims, 12 Drawing Sheets

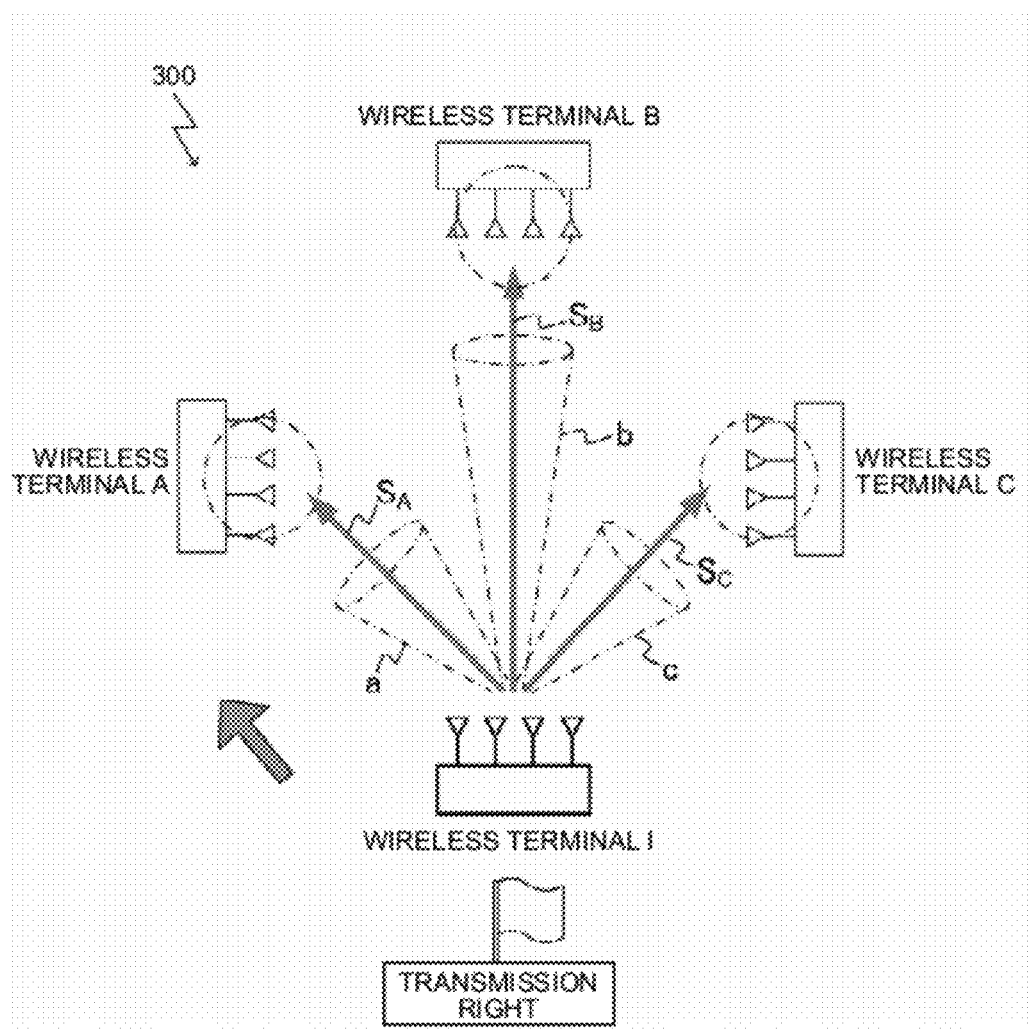

FIG.3

| | SLOT 0 | SLOT 1 | SLOT 2 | SLOT 3 | SLOT 4 | ... |
|---|---|---|---|---|---|---|
| WIRELESS TERMINAL I | TRANSMISSION →A / TRANSMISSION →B / TRANSMISSION →C | A→RECEPTION | B→RECEPTION | C→RECEPTION | TRANSMISSION →A / TRANSMISSION →B / TRANSMISSION →C | ... |
| WIRELESS TERMINAL A | I→RECEPTION | TRANSMISSION →I / TRANSMISSION →B / TRANSMISSION →C | B→RECEPTION | C→RECEPTION | I→RECEPTION | ... |
| WIRELESS TERMINAL B | I→RECEPTION | A→RECEPTION | TRANSMISSION →A / TRANSMISSION →I / TRANSMISSION →C | C→RECEPTION | I→RECEPTION | ... |
| WIRELESS TERMINAL C | I→RECEPTION | A→RECEPTION | B→RECEPTION | TRANSMISSION →A / TRANSMISSION →B / TRANSMISSION →I | I→RECEPTION | ... |

SYSTEM, DEVICE AND METHOD FOR TDMA-BASED NETWORKING USING SPACE DIVISION MULTIPLEXED TRANSMISSIONS

CROSS-REFERENCE TO RELATED APPLICATIONS

The present application claims priority to and incorporates by reference the entire contents of Japanese Patent Application No. 2010-207489 filed in Japan on Sep. 16, 2010 and Japanese Patent Application No. 2011-133073 filed in Japan on Jun. 15, 2011.

BACKGROUND OF THE INVENTION

1. Field of the Invention

The present invention relates to a wireless communication system, and more particularly, to an asymmetric wireless communication system applied to an equally distributed network.

2. Description of the Related Art

Conventionally, in a network including a wireless base station and a plurality of wireless terminal devices, an asymmetric wireless access system in which a space division multiple access (SDMA) scheme is used for a downlink line which is large in communication volume from a base station to a terminal while a time division multiple access (TDMA) scheme is used for a uplink line which is relatively small in communication volume from a terminal to a base station is under review. Japanese Patent No. 7926669 discloses a wireless communication system employing such an asymmetric wireless access system.

Here, the principle of the SDMA scheme is briefly described based on Japanese Patent No. 4435039, FIG. 12 is a functional block diagram of a transmitting device for spatial multiplexing transmission disclosed in Japanese Patent No. 4435039. As illustrated in FIG. 12, a transmitting device 700 for spatial multiplexing transmission includes a distributing unit 710 that distributes a transmission signal sequence input from a transmission signal input terminal; a plurality of modulating units 720(1) to 720(n); a plurality of directivity forming units 740(1) to 740(n), a plurality of synthesizing units 760(1) to 760(n), and a plurality of antenna elements 780(1) to 780(n). The modulating units 720(1) to 720(n) perform previously set modulation on signals distributed by the distributing unit 710 and output modulation signals to the directivity forming units 740(1) to 740(n). The directivity forming units 740(1) to 740(n) generate modulation signals which are different in amplitude and phase for each antenna by multiplying the modulation signals from the modulating units 720(1) to 720(n) by weight coefficients specific to the respective antennas. The generated modulation signals are output to the antenna elements 780(1) to (780(n) via the synthesizing units 760(1) to 760(n) provided for the respective antenna elements. In this way, the modulation signals having different amplitudes and phases transmitted from the respective antennas are spatially multiplexed, and thus modulation signals having directivities are generated. In the transmitting device 700 for spatial multiplexing transmission, the modulation signals (the modulation signals having different amplitudes and phases for the respective antennas) that are output from the directivity forming units 740(1) to 740(n) are input to and synthesized (added up) by each of the synthesizing units 760(1) to 760(n) provided for the respective antenna elements and then transmitted from the antenna elements 780(1) to 780(n). As a result, the modulation signals having different directivities are generated as many as the number of the directivity forming units 740(1) to 740(n), so that space division multiplexing transmission is realized.

Meanwhile, an equally distributed network in which terminals communicate directly with each other without a base station has attracted attention recently. Here, when the SDMA scheme is applied to the equally distributed network having no base station, in a system including N terminals, if all terminals transmit signals of (N−1) paths to the other terminals at the same time, a huge number of space paths of N×(N−1) are generated within the system, influence of an interference wave is problematic. In addition, a receiving side terminal needs to process signals from (N−1) other terminals at the same time, and thus there is a problem n that a load thereof becomes vast. Further, when such communication is performed at a common frequency, since a transmitting terminal and a receiving terminal need to be separated, complicated control is necessary. In addition, in the case of a mobile terminal, since the position of the terminal is not fixed, how to control directivity of a transmitting signal toward a moving terminal becomes problematic.

SUMMARY OF THE INVENTION

It is an object of the present invention to at least partially solve the problems in the conventional technology.

According to an aspect of the present invention, there is provided a wireless communication system including a plurality of wireless terminals that configure an equally distributed network having no base station. Each of the wireless terminals includes a space division multiplexing (SDM) transmitting unit that includes an array antenna including a plurality of antennas and generates a plurality of directional radio signals to be transmitted to other terminals within the network, each of the directional radio signals being obtained by superimposing a plurality of radio signals at the antennas, each of the radio signals at the antennas being composed of modulated data for each of the other terminals; a single-system receiving unit; and a time division multiple access (TDMA) control unit that controls a transmission operation of the SDM transmitting unit and a reception operation of the receiving unit in a time division manner. Using a TDMA scheme, the wireless terminals are controlled in such a manner that any one of the wireless terminals acquires a transmission right for a predetermined time period to simultaneously transmit the generated directional radio signals from the SDM transmitting unit, while during the predetermined time period, the receiving units of the other wireless terminals having no transmission right simultaneously receive their corresponding directional radio signals which are different from each other.

According to another aspect of the present invention, there is provided a wireless terminal that configures an equally distributed network having no base station. The terminal includes a space division multiplexing (SDM) transmitting unit that includes an array antennas including a plurality of antennas and generates a plurality of directional radio signals to be transmitted to other terminals within the network, each of the directional radio signals being obtained by superimposing a plurality of radio signals at the antennas, each of the radio signals at the antennas being composed of modulated data for each of the other terminals; a single-system receiving unit; a time division multiple access (TDMA) control unit that controls a transmission operation of the SDM transmitting unit and a reception operation of the receiving unit in a time division manner; a terminal direction measuring unit that periodically measures directions of the other terminals within the network; and an antenna directivity control unit that controls a transmission operation of the SDM transmitting unit such that directivity of each of the directional radio signals matches the direction of each of the other terminals. The antenna directivity control unit includes an adjustment parameter reference table that stores therein adjustment parameters respectively corresponding to directions; and an adjustment parameter setting table that manages the adjustment parameters in association with terminal IDs. The SDM transmitting unit executes a transmission operation of the directional radio signals using the adjustment parameters associated with the terminal IDs.

According to still another aspect of the present invention, there is provided a method executed by a computer of operating a wireless communication device that configures an equally distributed network having no has station. The method includes simultaneously transmitting, by the wireless communication device, a plurality of directional radio signals each obtained by superimposing a plurality of radio signals at antennas, each of which is composed of modulated data for each of other wireless communication devices, to the other wireless communication devices within the network according to a space division multiplexing scheme; receiving radio signals transmitted from the other wireless communication devices within the network by a single-system receiving unit of the wireless communication device; controlling, by the wireless communication device, an operation of transmitting the directional radio signal and an operation of receiving the radio signal in a time division manner; periodically measuring, by the wireless communication device, directions of the other wireless communication devices within the network; acquiring, by the wireless communication device, adjustment parameters respectively corresponding to the measured directions of the other wireless communication devices with reference to an adjustment parameter reference table storing therein adjusting parameters respectively corresponding to directions; and generating, by the wireless communication device, the directional radio signals to be transmitted to the other wireless communication devices using the adjustment parameters.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a conceptual diagram for explaining en operation of a wireless communication system according to the present embodiment;

FIG. 3 is a diagram illustrating the flow of information signals of each time slot in a wireless communication system according to the present embodiment;

DETAILED DESCRIPTION OF THE PREFERRED EMBODIMENTS

Figure 2A:
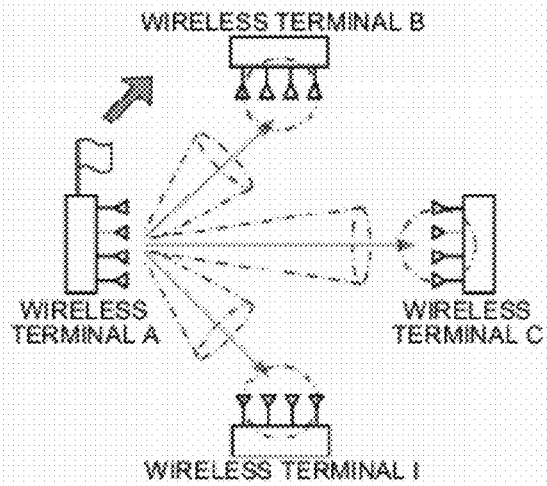
FIGS. 2A to 2C are conceptual diagrams for explaining an operation of a wireless communication system according to the present embodiment.

As a result of keen study on a wireless communication system capable of maximizing the communication volume of the entire system in the equally distributed network system having no base station, the present inventor has found that the communication volume of the entire system can be realistically maximized by combining the SDMA scheme with the TDMA scheme and further employing a direction measurement control technique, leading to the present invention.

Hereinafter, exemplary embodiments of the present invention will be described. However, the present invention is not limited to the following embodiments. Note that, in the drawings, like reference numerals denote like parts, and thus a redundant description thereof will not be appropriately repeated.

A wireless communication system of the present invention is configured as an equally distributed network system including N wireless terminals. Each wireless terminal performs communication directly with other terminals within the network without a wireless base station. In the present system, each wireless terminal employs eigenbeam-space division multiplexing (E-SDM) for transmission. That is, each wireless terminal can form a transmission multibeam having directivity on (N−1) directions and implements simultaneous communication of a plurality of paths through channels established by respective beams.

Figure 2B:
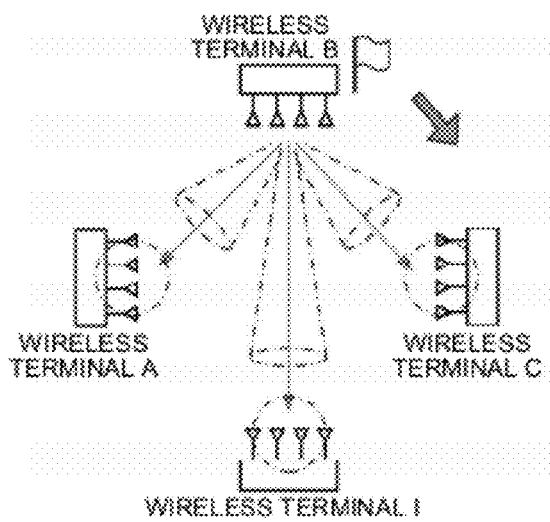
Figure 2C:
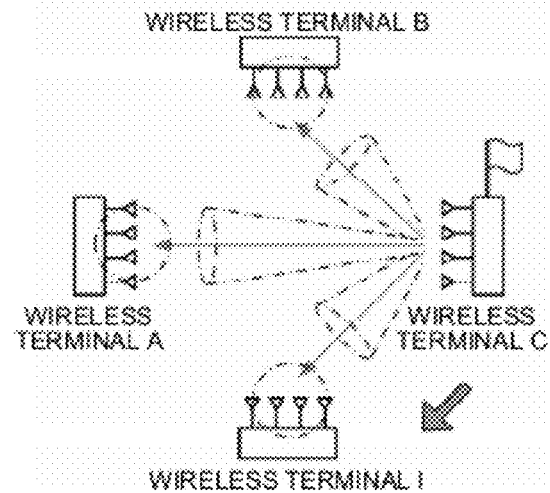

FIG. 1 is a conceptual diagram for explaining an operation of a wireless communication system 300 according to an embodiment of the present invention. In FIG. 1, for easy description, illustrated is a system including four wireless terminals I, A, B, and C. In the wireless communication system 300 of this embodiment, the wireless terminals I, A, B, and C are controlled in such a manner that a transmission right is allocated only to one wireless terminal among the four wireless terminals for a predetermined time period, while during the predetermined time period, the remaining three terminals are prohibited from performing data transmission. The transmission right is sequentially allocated to the four wireless terminals I, A, B, and C in a time division manner and retained in each terminal during the predetermined time period (a time slot). In a time slot [0] illustrated in FIG. 1, the transmission right is given to the wireless terminal I, and the remaining terminals A, B, and C are allowed to perform only a reception operation. When the time slot [0] is finished, the transmission right transitions from the wireless terminal I to the wireless terminal A. In a next time slot [1] subsequent to the time slot [0], as illustrated in FIG. 2A, the wireless terminal A acquires the transmission right. In a time slot [2], as illustrated in FIG. 2B, the wireless terminal B acquires the transmission right, and in a time slot [3], as illustrated in FIG. 2C, the wireless terminal C acquires the transmission right. Thereafter, in a next time slot, the transmission right is returned to the wireless terminal I, and the above procedure is sequentially repeated.

Referring back to FIG. 1, an antenna of the wireless terminal I forms three transmission beams a to c having different directivities and transmits signals $S_A$ to $S_C$ of different data sequences to the wireless terminals A to C using channels established by the respective beams at the same time and the same frequency. At this time, the wireless terminals A to C having no transmission right perform only a reception operation. Here, focusing on the wireless terminal A, since only the three paths (information signals $S_A$ to $S_C$), each of which transmission source is the wireless terminal I, exist in the system at the same time and the information signals $S_B$ and $S_C$ other than the information signal $S_A$ become a noise level, the wireless terminal A can reliably receive and demodulate only the information signal $S_A$ destined to itself. That is, a receiving unit of the wireless terminal A needs not to include a signal separation mechanism or an interference wave removing mechanism and may be a non-directional receiving unit for a single path. The above described configuration related to transmission and reception is included in common in all of the wireless terminal terminals I, A, B, and C.

FIG. 3 is a diagram illustrating the flow of information signals of each time slot in the wireless communication system 300. As illustrated in FIG. 3, in a time slot [0], through three communication paths, i.e., a path from the wireless terminal I to the wireless terminal A, a path from the wireless terminal I to the wireless terminal B, and a path from the wireless terminal I to the wireless terminal C, information signals toward the wireless terminals A to C are transmitted from the wireless terminal I at the same time; and each of the wireless terminals A to C receive only an information signal, which is destined to itself, transmitted from the wireless terminal I. Subsequently, even in time slots [1], [2], [3], ..., and [n], in a similar manner, each wireless terminal transmits the information signals to the other wireless terminals within the system at the same time during one slot time period in which the transmission right is given; and, during other slot time periods, performs only reception of an information signal, which is destined to itself from another wireless terminal having the transmission right during a corresponding time period.

Here, assuming that the TDMA scheme is applied to the equally distributed network. In such a system, only one communication path can be formed for each one slot. However, according to this embodiment, since (N−1) communication paths can be formed for each one slot, the communication volume becomes (N−1) times as much as the system employing the TDMA scheme.

Next, assuming that a system in which all terminals configuring the equally distributed network perform transmission and reception at the same time by space division multiplexing (SDM). In such a system, if the terminals perform transmission and reception at the same time, since a transmitting signal interrupts reception and normal communication is difficult to perform, it is necessary to separate all terminals within the network into a transmitting side and a receiving side. If half of all terminals is separated into a transmission source and the remaining half is separated into a reception destination, the number of simultaneous communication paths is $(N/2)^2$, and it is possible to implement the communication volume which is theoretically N/4 times as much as the present embodiment.

However, in the case of the equally distributed network having no base station, when all terminals perform transmission and reception at the same time by space division multiplexing, a huge number of spatial paths are generated. As a result, the receiving side has to eliminate interference caused by a huge number of paths while processing a plurality of information signals from the other terminals at the same time. In addition, actually it is very difficult to appropriately separate all terminals within the network into the transmitting side and the receiving side so that transmission and reception can be equally guaranteed between terminals as a huge number of paths are generated.

In this regard, in the present embodiment, employed is a configuration in which the transmission right is alternatively given only to one terminal among all terminals configuring the equally distributed network for a predetermined time period so that the terminal having acquired the transmission right is allowed to perform space division multiplexing transmission during the predetermined time period while the remaining terminals receive only the transmitting signal from the terminal having acquired the transmission right. As a result, each terminal needs not to perform complicated switching control of transmission and reception modes or signal separation/interference wave removing control; and a configuration of the terminal can be significantly simplified. The operation of the wireless communication system 300 according to the present embodiment has been described above so far. Next, a detailed description will be made in connection the wireless terminal device that configures the wireless communication system 300.

Figure 4:
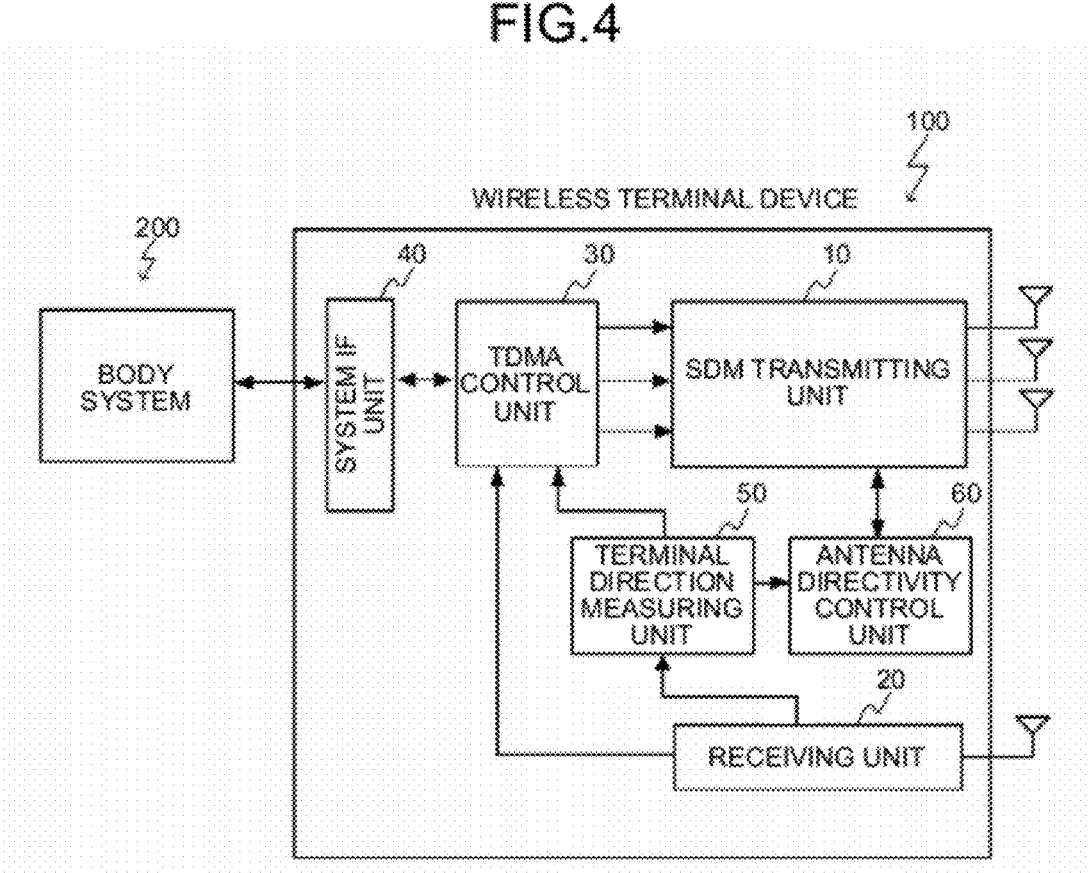
FIG. 4 is a functional block diagram of a wireless terminal device according to the present embodiment.

FIG. 4 is a functional block diagram of a wireless terminal device 100 that configures the wireless communication system 300. The wireless terminal device 100 includes a space division multiplexing (SDM) transmitting unit 10, a receiving unit 20, a time division multiple access (TDMA) control unit 30, and a system interface (IF) unit 40 and preferably further includes a terminal direction measuring unit 50 and an antenna directivity control unit 60.

The TDMA control unit 30 includes (N−1) media access control (MAC) transmitting units, one MAC receiving unit, and a time division access control unit and controls a transmission operation of the SDM transmitting unit 10 and a reception operation of the receiving unit 20 in a time division manner. In the present embodiment, as a time division access control scheme, there may be employed as TDMA scheme in which an access permission during a specific time period is periodically given to each terminal. The (N−1) MAC transmitting units execute a transmission process related to a MAC layer on input data and generate input data which is to be directed to each baseband (BB) transmitting unit of the SDM transmitting unit. Meanwhile, the MAC receiving unit performs a reception process related to the MAC layer on demodulation data supplied from the BB receiving unit.

The SDM transmitting unit 10 is a functional unit that transmits a plurality of data streams which are respectively associated with inherent transmission beams (channels) which are different in directivity from each other. Preferably, the SDM transmitting unit 10 forms (N−1) directional beams by a beam forming technique when (N−1) wireless terminals are a transmission destination.

The SDM transmitting unit 10 is a function unit that generates a power feeding signal for each antenna element of an array antenna including a plurality of antenna elements by digital signal processing; electrically adjusts an orientation direction of a transmitting information signal for each of the other terminals within the network; then converts the transmitting information signal into a directional radio signal; and transmits the directional radio signals to the other terminals simultaneously.

The SDM transmitting unit 10 includes (N−1) BB transmitting units, an SDM unit that converts (N−1) BB transmitting signals into M antenna transmitting signals, and M antenna elements. Each BB transmitting unit modulates data input from the TDMA control unit into the BB signal. The SDM unit duplicates the (N−1) BB signals by the number of antenna elements; multiplies the BB signals by an adjustment coefficient related to the amplitude and phase; inputs, to the M antennas, a total sum of signals obtained by multiplying all of the BB transmitting signals by the adjustment coefficient; up-converts the signals into high frequency (RF) signals; and transmits the RF signals as the radio wave through the antenna elements. The M same signals (which are different in amplitude and phase) transmitted from the M antenna elements are spatially multiplexed, and thus signals having directivities in predetermined directions are derived. Here, in the SDM units, a different adjustment coefficient is set for each combination of the BB signal and the antenna, and as a result, a transmission multibeam having directivities in (N−1) directions is formed. The adjustment coefficient is represented by a complex matrix of M rows and (N−1) columns. In FIG. 4, three antenna signals are illustrated on the SDM transmitting unit 10. However, the number (N−1) of BB signals needs not be identical to the number M of antennas, and (N−1) is preferably M or less. The M transmitting antennas are simultaneously shared by the (N−1) BB transmitting units.

The receiving unit 20 includes a RF receiving unit that down-converts an RF signal received via an antenna into a BB signal and a BB receiving unit that demodulates the down-converted BB signal. In the present system, it is sufficient for the receiving unit 20 to be configured for a single path, and the receiving unit 20 needs not have a signal separation configuration or an interference wave removal configuration for SDM reception. Further, since the receiving unit 20 does not perform directivity control, the receiving unit 20 can share the array antenna with the SDM transmitting unit 10; may use any one of the array antenna as a non-directional receiving antenna; may use a plurality of antennas as the receiving antenna; and may use a signal obtained by simply synthesizing output signals thereof as a receiving signal.

Next, a description will be made in a case in which the present embodiment is applied to a device complying with a WiMedia standard. The TDMA control unit 30 performs time synchronization of the system by exchanging a beacon with the other terminals within the system during a beacon time period of each frame header in a super frame of a cycle of 65,536 μs constituted by 256 media access slots (MAS) each of which has a time period of 256 μs. The TDMA control unit 30 controls the SDM transmitting unit 10 and the receiving unit 20 according to a time period of an MAS reserved using a beacon. Specifically, switched are alternately a multi-path transmitting mode in which data input from a body system unit 200 via the system IF unit 40 is transmitted in a predetermined time slot and a single-path receiving mode in which a signal transmitted from the other terminal is received in a predetermined time slot by a single path, decoded, and output to the body system unit 200 via the system IF unit 40.

Here, when the wireless communication system 300 of the present embodiment is a system including a mobile wireless terminal, it has to be premised that a mutual positional relation between terminals within the network dynamically change. That is, as a positional relation between terminals within the network changes, it is necessary to adaptively change antenna directivity of each terminal. Here, if a receiving side of a terminal that has moved supports the SDM scheme, by returning a characteristic of a propagation channel from a mobile terminal side to a terminal of a transmitting side, the terminal of the transmitting side can adjust directivity based on the characteristic. However, in the present embodiment, since the receiving unit 20 does not support the SDM scheme as described above, an alternative method needs be considered. On this point, in order to implement adaptive control of antenna directivity, the wireless terminal device 100 of the present embodiment includes the terminal direction measuring unit 50 and the antenna directivity control unit 60. A specific description will be made below in connection with functions of the terminal direction measuring unit 50 and the antenna directivity control unit 60.

The terminal direction measuring unit 50 measures a direction of the other terminal within the network which is viewed from the wireless terminal device 100 (the transmitting side) at regular intervals and notifies the antenna directivity control unit 60 of the direction. The antenna directivity control unit 60 provides a directivity adjustment parameter corresponding to the notified direction to the SDM transmitting unit 10. As a result, directivity of each transmission beam formed by the SDM transmitting unit 10 matches a direction of each of the other terminals. A description will be made in connection two embodiments on the terminal direction measuring unit 50.

Figure 5:
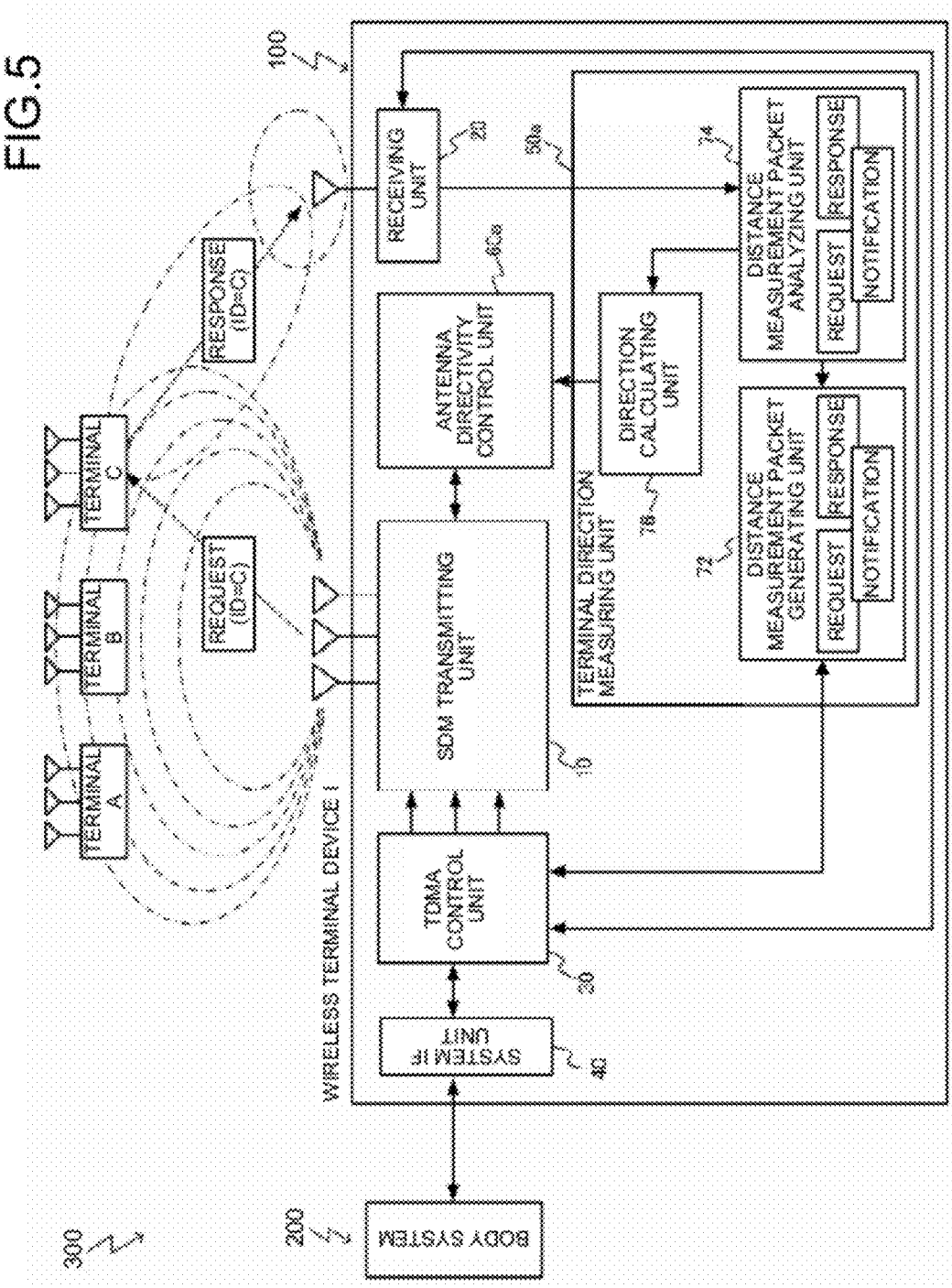
FIG. 5 is a diagram illustrating a wireless communication system according to a first embodiment.

FIG. 5 illustrates a wireless communication system 300 configured with the wireless terminal device 100 including a terminal direction measuring unit 50a according to a first embodiment. The wireless communication system 300 is configured with four wireless terminals I, A, B, and C; FIG. 5 representatively illustrates functional blocks of the wireless terminal I among them; and the remaining wireless terminals A, B, and C have the same configuration (which is hereinafter the same with FIG. 8).

The terminal direction measuring unit 50a includes a distance measurement packet generating unit 72 that generates a distance measurement packet for measuring a separation distance between its own terminal and the other terminals within the network, a distance measurement packet analyzing unit 74 that analyzes a distance measurement packet transmitted from another terminal within the network, and a direction calculating unit 76 that calculates and obtains a direction of another terminal viewed from its own terminal based on the distance measurement packet.

The distance measurement packet generating unit 72 generates a "distance measurement request packet", in which a "transmission request time" is associated with a terminal ID of another terminal within the network, for each ID. The "transmission request time" is generated based on a time table having predetermined time intervals. In an example illustrated in FIG. 5, the distance measurement packet generating unit 72 generates distance measurement request packets a to c for the terminals A to C and requests the TDMA control unit 30 to transmit the generated distance measurement request packets. The TDMA control unit 30 controls the SDM transmitting unit 10 according to the reserved MAS based on the "transmission request time" included in the distance measurement request packets such that the distance measurement request packets a to c are transmitted at the "transmission request time". At this time, the SDM transmitting unit 10 adjusts only one system to non-directivity and sequentially transmits the non-directional distance measurement request packets a to c omnidirectionally using the one system.

When it is detected that the received packets are the distance measurement request packets, each receiving unit 20 of each of the terminals A to C within the network transmits the received packets to the distance measurement packet analyzing unit 74. As a result, the distance measurement packet analyzing unit 74 receives the distance measurement request packets a to c transmitted from the terminal I and analyzes whether or not the terminal IDs included in the received distance measurement request packets are identical to its own terminal ID. When it is analyzed that the terminal ID is identical to its own terminal ID, the distance measurement packet analyzing unit 74 requests the distance measurement packet generating unit 72 to generate a "distance measurement response packet" in response to the distance measurement request packet.

Here, generation of the "distance measurement response packet" is exemplarily described in connection with the terminal C. The distance measurement packet generating unit 72 of the terminal C generates a distance measurement response packet c in which its own terminal ID is associated with the "transmission request time" included in the distance measurement request packet c and requests the TDMA control unit 30 to transmit the distance measurement response packet c. The TDMA control unit 30 controls the SDM transmitting unit 10 such that the distance measurement response packet c is transmitted. At this time, similarly to the case of the distance measurement request packet, the SDM transmitting unit 10 omnidirectionally transmits the distance measurement response packet c using only one system adjusted to non-directivity.

The distance measurement response packet c omnidirectionally transmitted from the terminal C is received by the receiving unit 20 of the terminal I. The receiving unit 20 detects that the received packet is the distance measurement response packet and transmits the received packet to the distance measurement packet analyzing unit 74. The distance measurement packet analyzing unit 74 acquires a "reception time" of the distance measurement response packet c and then calculates a separation distance between the terminal I and the terminal C based on a difference between the "reception time" and the "transmission request time" included in the distance measurement response packet c. The distance measurement packet analyzing unit 74 of the terminal I calculates a separation distance between the terminal I and the terminal A and a separation distance between the terminal I and the terminal B in the same procedure as described above; and transmits the obtained three separation distances (between I and C, between I and A, and between I and B) to the direction calculation unit 76.

Further, the distance measurement packet analyzing unit 74 requests the distance measurement packet generating unit 72 to generate a "distance measurement notification packet" for notifying the other terminals of the three separation distances (between I and C, between I and A, and between I and B). The distance measurement packet generating unit 72 generates distance measurement notification packets c, a, and b in which the three separation distances are associated with the terminal Its of the terminal C, A, and B which are transmission destinations; and requests the TDMA control unit 30 to transmit the distance measurement notification packets. Thus, the SDM transmitting unit 10 sequentially transmits the distance measurement notification packets c, a, and b omnidirectionally.

Meanwhile, the receiving unit 20 of the terminal I receives distance measurement notification packets c, a, and b from the other terminals C, A, and B. When it is detected that the received packets are the distance measurement notification packets, the receiving unit 20 of the terminal I transmits the received packets to the distance measurement packet analyzing unit 74. The distance measurement packet analyzing unit 74 analyzes whether or not the terminal IDs included in the distance measurement notification packets c, a, and b are identical to its own terminal ID. As a result, when it is analyzed that the terminal IDs are identical to its own terminal ID, the distance measurement packet analyzing unit 74 transmits the separation distances (between A and C, between A and B, and between B and C) included in the distance measurement notification packets c to the direction calculating unit 76.

Figure 6:
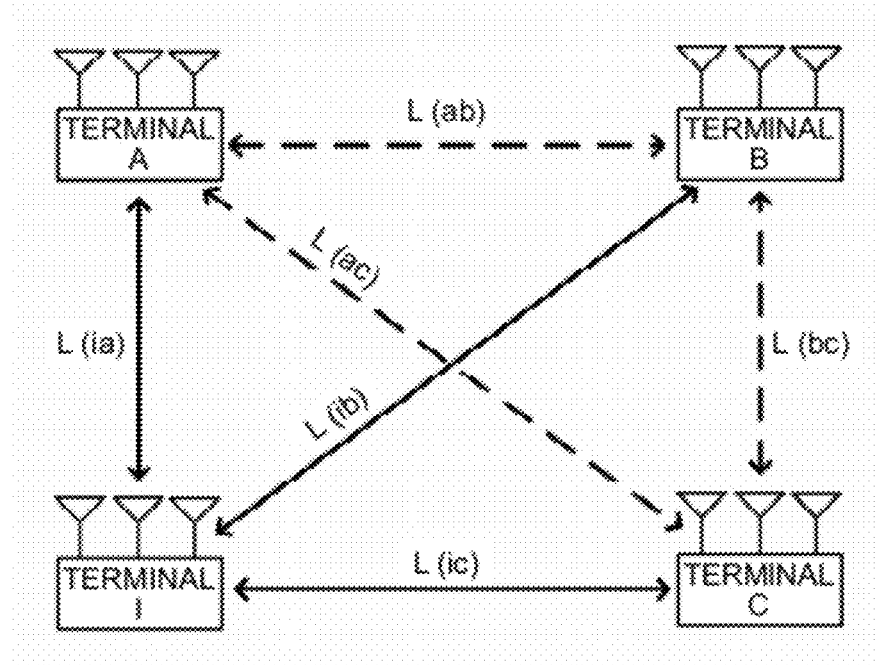
FIG. 6 is a diagram illustrating separation distance information acquired by the wireless communication system according to the first embodiment.

FIG. 6 illustrates separation distance information acquired by the wireless terminal I as a result of executing the aforementioned procedure in the wireless communication system 300. As illustrated in FIG. 6, the wireless terminal I directly acquires separation distances L(ia), L(ib), and L(ic) from the terminals A, B, and C by transmitting the distance measurement request packet and receiving the distance measurement response packet; and acquires other separation distances L(ab), L(bc), and L(ac) from the distance measurement notification packet transmitted from the terminals A to C.

The direction calculating unit 76 that has received the six pieces of separation distance information illustrated in FIG. 6 from the distance measurement packet analyzing unit 74 performs a calculation using the principle of trilateration based on a base-line length obtained based on known positional information of some terminals and the six pieces of separation distance information; and calculates directions of the terminals A to C viewed from the terminal I. The direction calculating unit 76 notifies an antenna directivity control unit 60a of a value (Rad) of a direction of each terminal, which has been obtained by the calculation, associated with the terminal ID.

Figure 7:
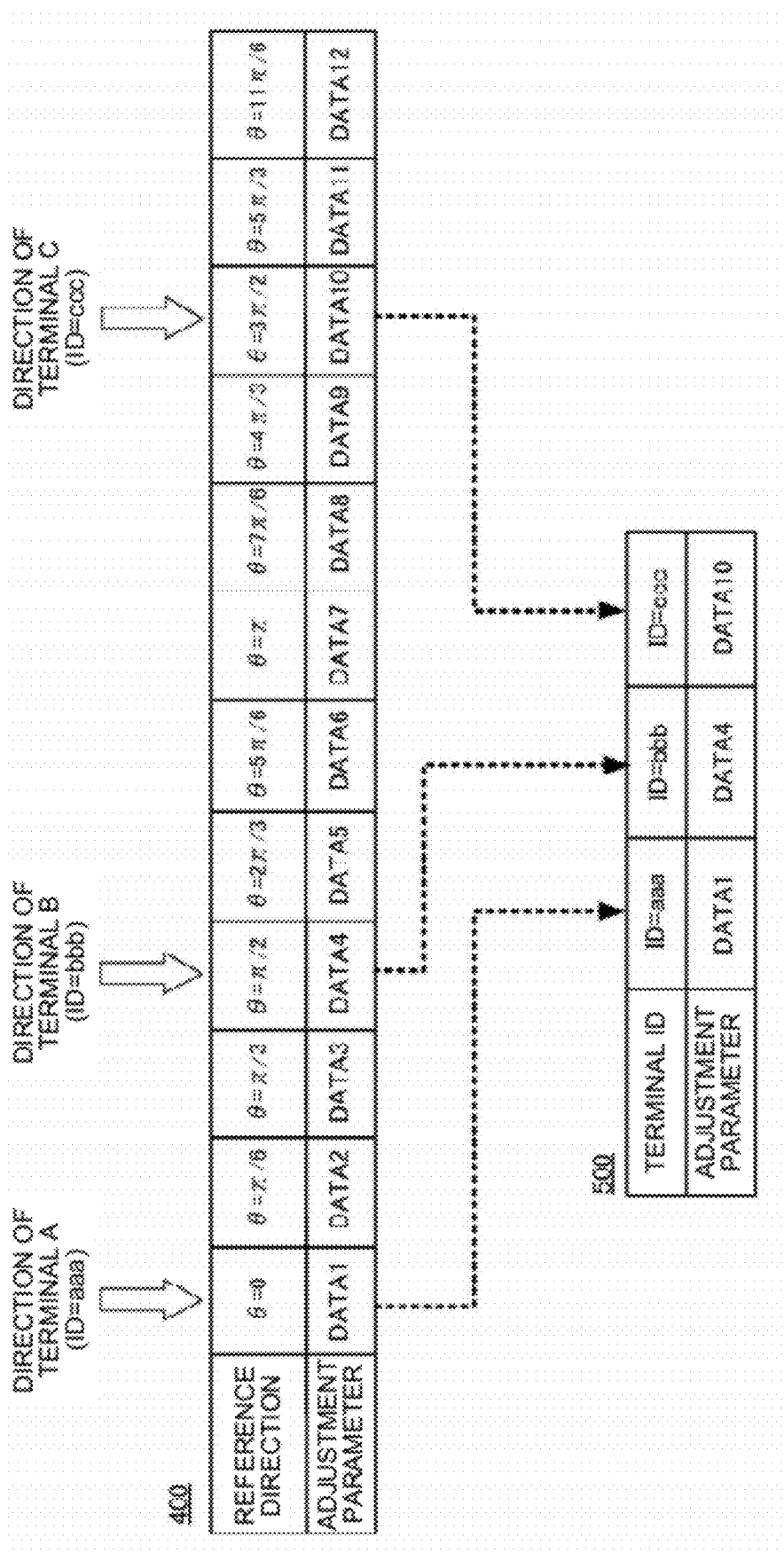
FIG. 7 is a diagram illustrating an adjustment parameter reference table and an adjustment parameter setting table according to the first embodiment.

In the present embodiment, the antenna directivity control unit 60a includes en adjustment parameter reference table 400 and en adjustment parameter setting table 500 illustrated in FIG. 7. The adjustment parameter reference table 400 stores therein directions obtained by equally dividing all directions and adjustment parameters for implementing directivities on the respective directions in an associated manner. In an example illustrated in FIG. 7, twelve reference directions are set. Here, the adjustment parameter refers to a set of various parameters for implementing high frequency (RF) beam formation having directivity of each direction (hereinafter, the same).

The antenna directivity control unit 60a refers to the adjustment parameter reference table 400 based on the direction notified from the distance measurement packet analyzing unit 74; and sets an adjustment parameter corresponding to a reference direction best approximate to a value of the notified direction and a terminal ID associated with the notified direction to the adjustment parameter setting table 500.

As a result of performing a series of processes using the distance measurement packet, as illustrated in FIG. 7, the adjustment parameters "DATA1", "DATA4", and "DATA10" are set to the adjustment parameter setting table 500 in association with the "ID of the terminal A", the "ID of the terminal B", and the "ID of the terminal C", respectively. The set values are retained until a next process is executed, and the table 500 is overwritten with a new value at the time of the next process. An update process of the adjustment parameter is preferably periodically executed at appropriate time intervals.

Figure 8:
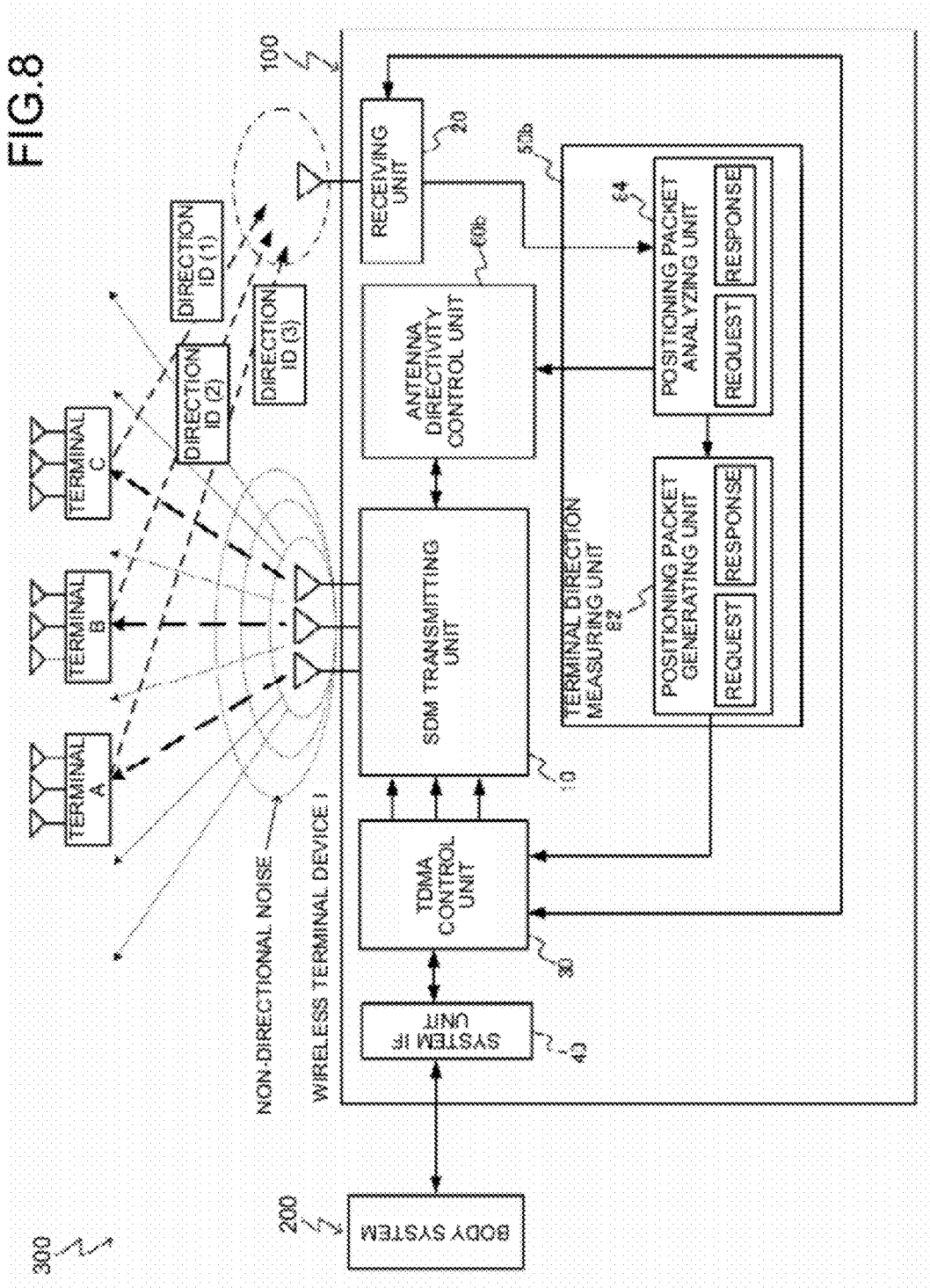
FIG. 8 is a diagram illustrating a wireless communication system according to a second embodiment.

Next, a description will be made in connection with a second embodiment. FIG. 8 illustrates a wireless communication system 300 configured with a wireless terminal device 100 including a terminal direction measuring unit 50b according to the second embodiment.

The terminal direction measuring unit 50b includes a positioning packet generating unit 82 that generates a positioning packet for measuring a direction of another terminal within the network viewed from its own terminal and a positioning packet analyzing unit 84 that analyzes a positioning packet transmitted from another terminal within the network.

Figure 9:
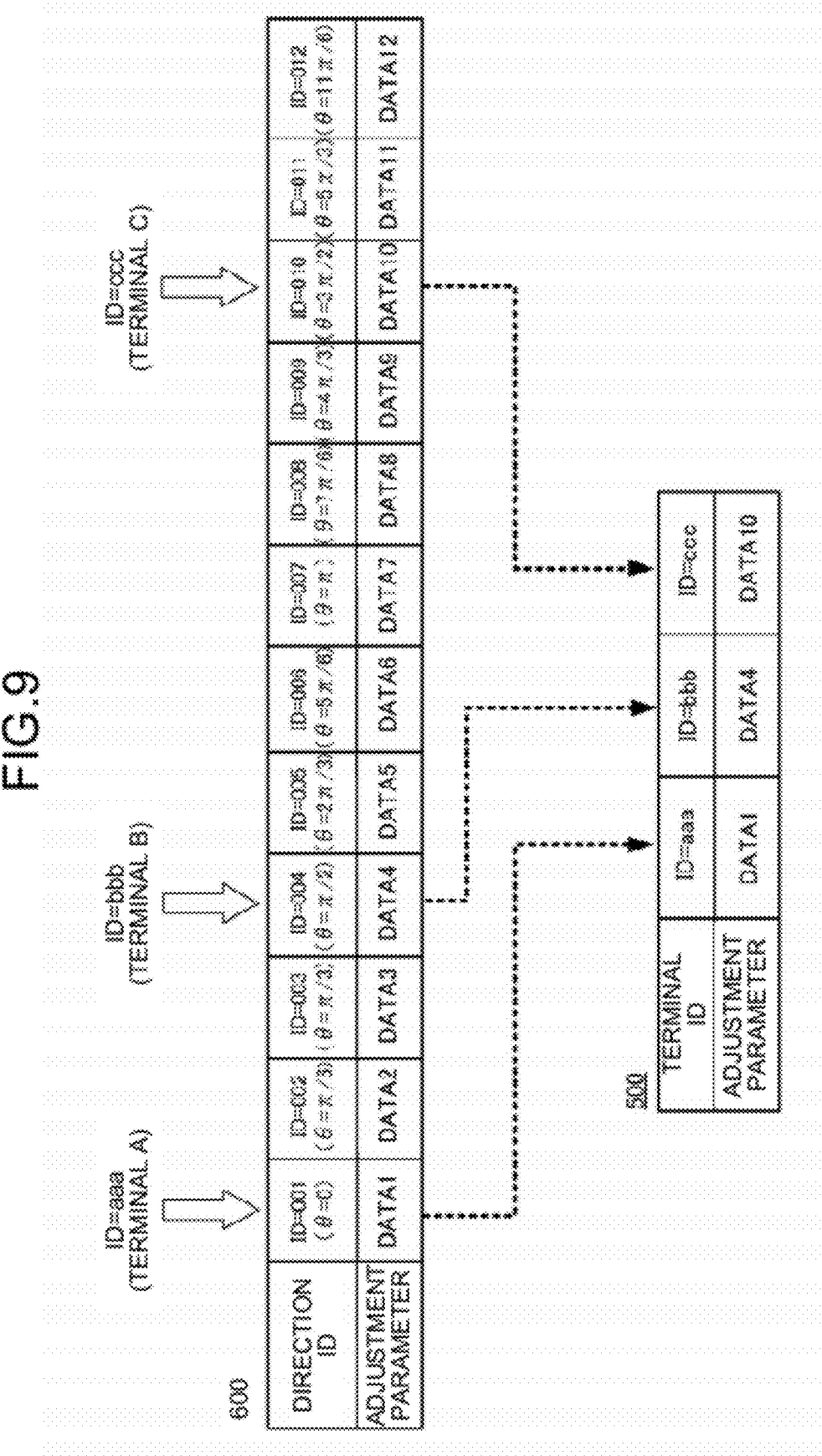
FIG. 9 is a diagram illustrating an adjustment parameter reference table and an adjustment parameter setting table according to the second embodiment.

In the present embodiment, an antenna directivity control unit 60b includes an adjustment parameter reference table 600 and the adjustment parameter setting table 500 illustrated in FIG. 9. The adjustment parameter reference table 600 stores therein direction IDs and adjustment parameters for implementing directivities on predetermined directions represented by the respective direction IDs in an associated manner. In an example illustrated in FIG. 9, twelve direction IDs are set.

The positioning packet generating unit 82 generates a plurality of positioning request packets including the direction IDs. For example, when the adjustment parameter reference table 600 illustrated in FIG. 9 is used, the positioning packet generating unit 82 generates 12 positioning request packets including ID001 to ID 012.

The positioning packet generating unit 82 requests the TDMA control unit 30 to transmit the generated twelve positioning request packets. The TDMA control unit 30 controls the SDM transmitting unit 10 such that the twelve positioning request packets are sequentially transmitted. At this time, the SDM transmitting unit 10 refers to the adjustment parameter reference table 600 based on the direction ID included in the positioning request packet and executes high frequency (RF) beam formation using the adjustment parameter corresponding to the direction ID. As a result, the 12 positioning request packets are transmitted toward directions represented by the direction IDs included in the packets as directional signals. At the same time, the SDM transmitting unit 10 superimposes a non-directional noise signal on the directional packet signals using any one transmitting antenna element. A configuration for superimposing the non-directional noise signal will be described below with reference to FIG. 10.

Figure 10:
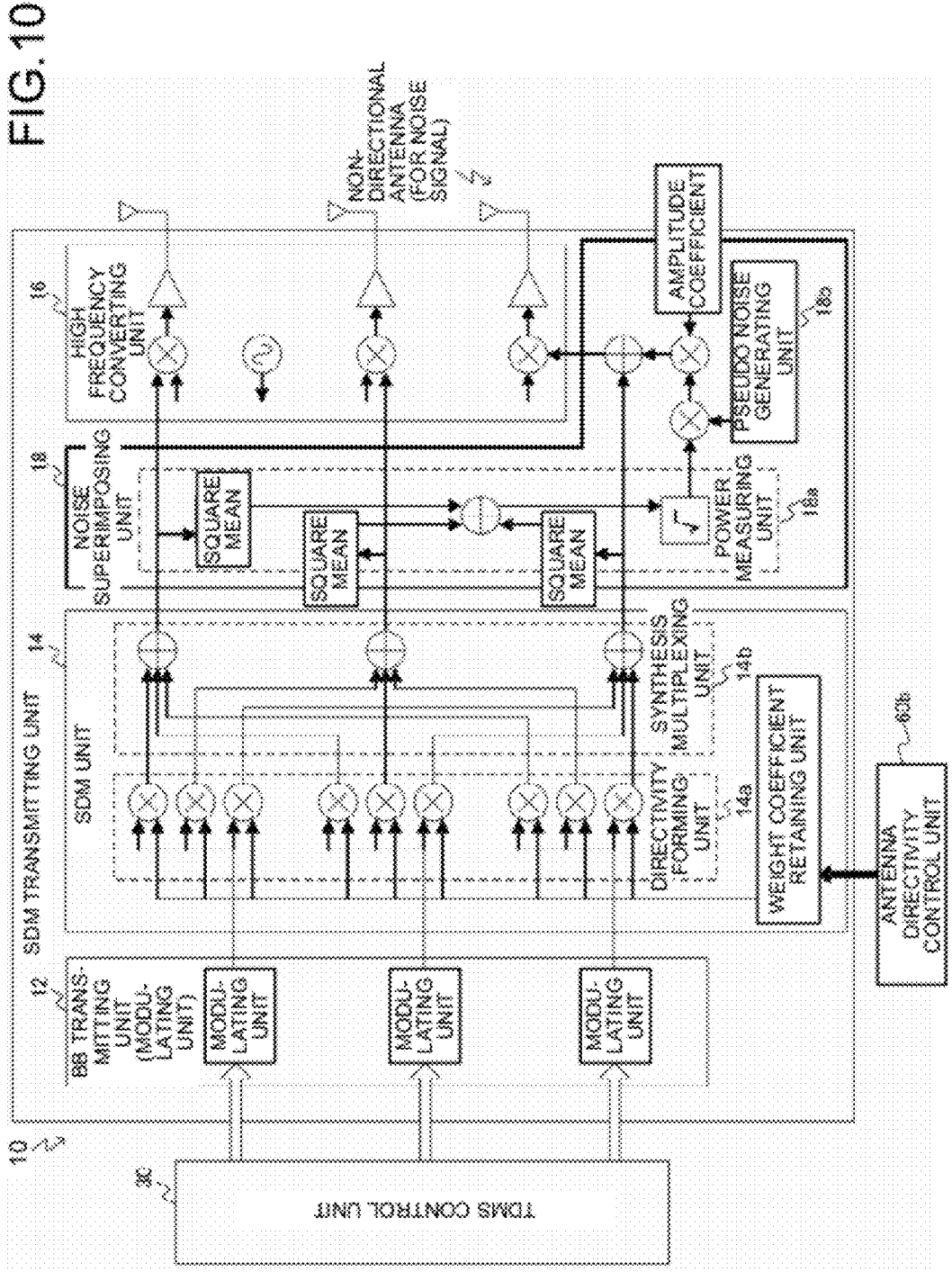
FIG. 10 is a functional block diagram of a space division multiplexing transmitting unit according to the second embodiment.

FIG. 10 illustrating functional blocks of the SDM transmitting unit 10 of FIG. 8. In the present embodiment, the SDM transmitting unit 10 is configured to include a noise superimposing unit 18 which is a functional unit for superimposing the non-directional noise signal in addition to a BB transmitting unit 12, a SDM unit 14, and a high frequency converting unit 16.

In the SDM unit 14, all weight coefficients of multipliers of a directivity forming unit 14a can be independently set, and directivity control on each transmission data string is performed by adjusting the coefficients of the multipliers. Subsequently, a synthesis multiplexing unit 14b adds up weighted signals of all transmission data strings for the respective antennas.

In the present embodiment, the noise superimposing unit 18 is configured to include a power measuring unit 18a and a pseudo noise generating unit 18b. The noise superimposing unit 18 optimizes a power level of a noise signal by the following procedure so that a power level of a data signal can be equal to a power level of a noise signal superimposed on the data signal. First, the power measuring unit 18a calculates an average amplitude of the data signal from a square root of the sum of square means of synthesis multiplexing outputs from the synthesis multiplexing unit 146. Next, the noise signal is generated by multiplying the calculated average amplitude by an output of the pseudo noise generating unit 18b with an average amplitude of 1. A signal obtained by multiplying the generated noise signal by an amplitude coefficient so as to have a predetermined signal-to-noise (SN) ratio is added to any one of data signals output from the synthesis multiplexing units 14b; and a resultant signal is input to the high frequency converting unit 16 as a noise source. The high frequency converting unit 16 converts the input noise source into a radio signal and outputs the radio signal to a non-directional antenna.

Figure 11A:
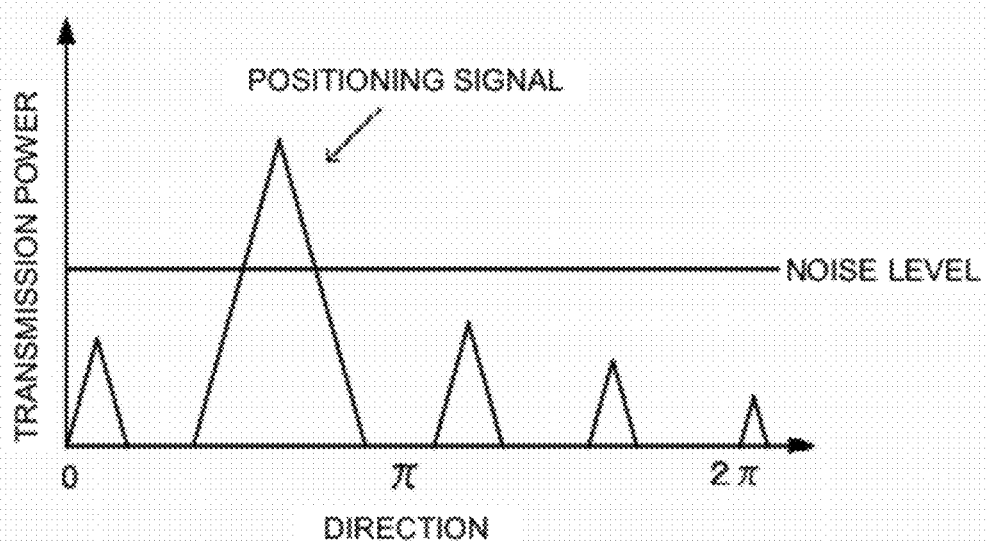
FIGS. 11A and 11B are diagrams each illustrating a relation between a setting direction of a transmitting side and a signal level of a receiving terminal side when a positioning request packet is transmitted according to the second embodiment.

Subsequently, a description will be made in connection with an effect of noise superimposition. If the noise signal is not superimposed on the positioning request packet signal, the terminals A to C may possibly pick up weak positioning request packet signals which are greatly deviated from directions toward themselves. In this regard, in the present embodiment, the noise signal is superimposed on the positioning request packet signal as described above, and then the receiving side receives only a signal having a large SN ratio. FIG. 11A illustrates a relation between a setting direction of a transmitting side and a signal level of a receiving terminal side when the positioning request packet is transmitted. As illustrated in FIG. 11A, each terminal can receive only a positioning request packet in which the SN ratio has reached a receivable level (that is, a positioning request packet transmitted in a proper direction toward itself) and returns a response packet; but does not receive any other positioning request packet signals since the SN ratio does not reach the receivable level. As a result, compared to the case based on absolute intensity of a signal, a degree of direction detection accuracy increases.

Figure 11B:
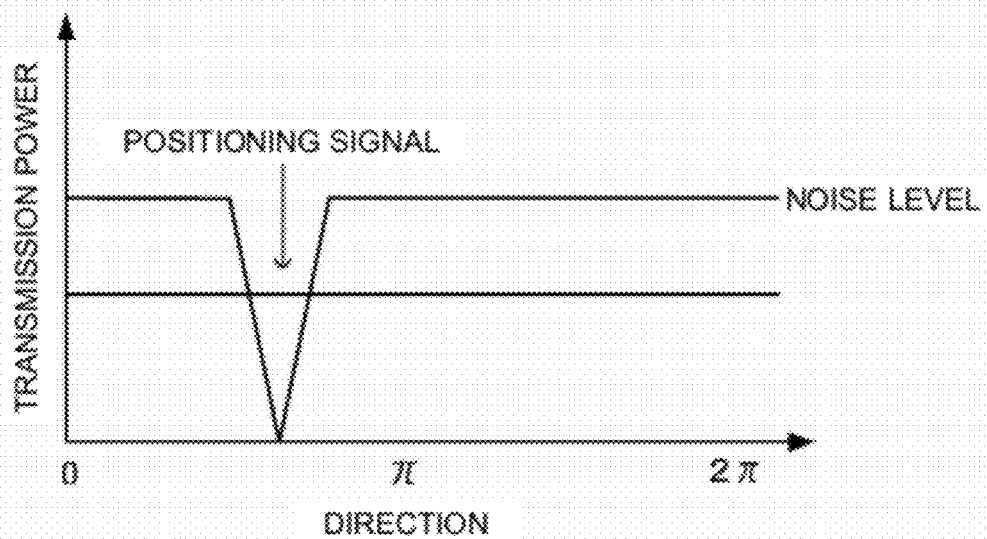
Figure 12:
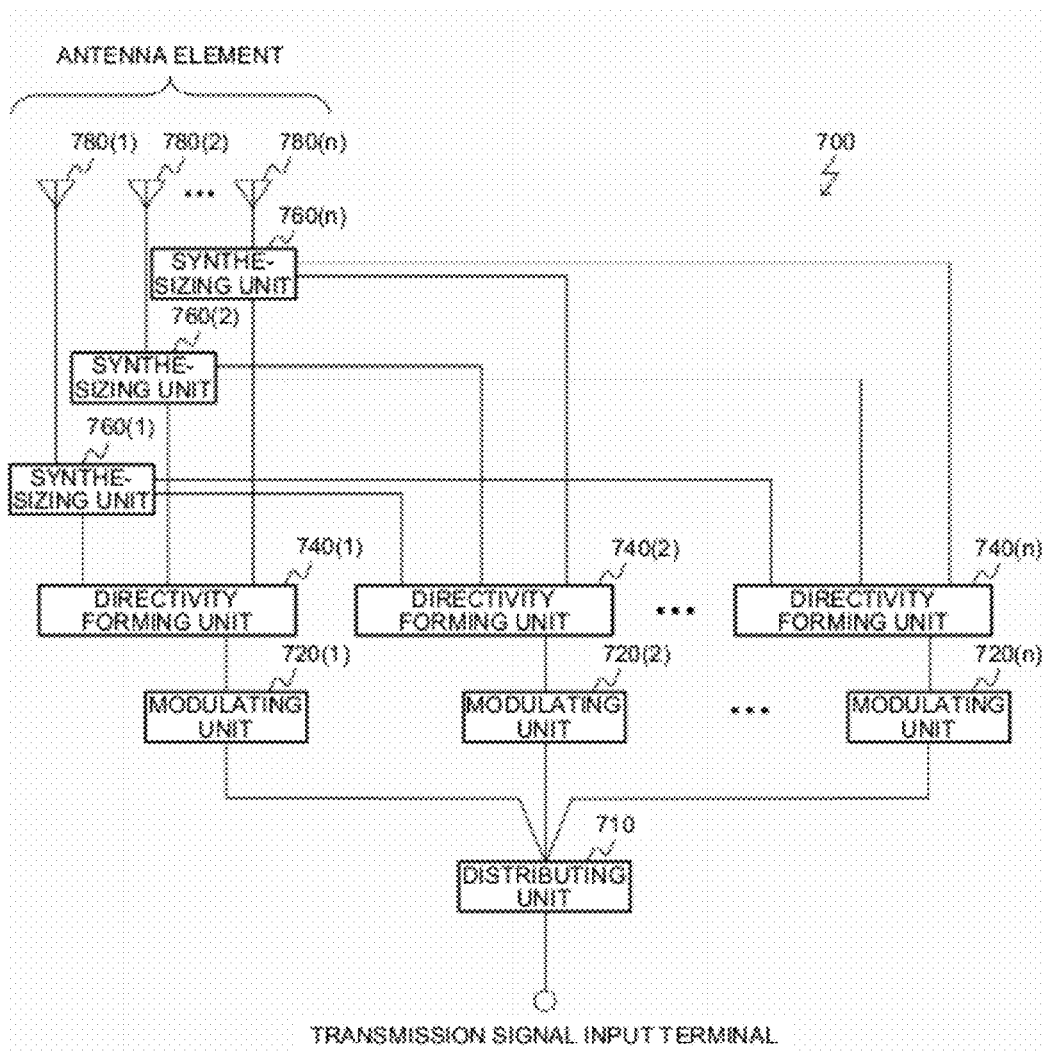
FIG. 12 is a conceptual diagram for explaining a principle of a space division multiple access (SDMA) scheme.

In another embodiment, forms of the positioning request packet signal and the noise signal may be reversed. That is, at the same time when the non-directional positioning request packet signal is omnidirectionally transmitted, a noise signal having a precipitous null point in a specific direction is superimposed on the non-directional positioning request packet signal and transmitted; and the null point is changed in time series. FIG. 11B illustrates a signal level at the receiving terminal side in this case. As illustrated in FIG. 11B, each terminal can receive the positioning request packet and returns the response packet since the SN ratio of the signal reaches the receivable level only in the vicinity of the null point of the noise signal; but does not receive any other positioning request packet signal since the SN ratio does not reach the receivable level. Even in a device having a small number of antenna elements, a null point can be generated, and thus it is possible to increase the degree of direction detection accuracy by employing this method.

In the present embodiment, for example, the pseudo noise generating unit 18b may be configured with an existing pseudo noise generating circuit such as a circuit that generates a pseudo noise signal by generating a binary pseudo noise sequence by a shift register, extracting two specific multi-bits from the binary pseudo noise sequence, and associating one multi-bit with the amplitude of the noise and the other multi-bit with a phase of the noise. If the weight coefficients for the multipliers of the directivity forming unit 14a are decided so that electric power after synthesis multiplexing can be constant, since the average amplitude of the data signal needs not be calculated, in this case, the power measuring unit 18a may not be disposed.

In the present embodiment, the noise levels illustrated in FIGS. 11A and 11B can be adjusted by the setting value of the amplitude coefficient. However, actually, as a directivity characteristic of the directional signal, the directional signal does not a peak in a signal direction, and several side lobes having the low amplitude are present. Thus, when the adjusted noise level is not appropriate, communication is established by the side lobe. As a result, the degree of direction acquisition accuracy may be lowered.

In this regard, in the present embodiment, the noise level can be appropriately set by the following procedure. That is, (1) when direction measurement starts, a noise level is set to a high level. (2) The positioning packet is transmitted toward each direction while rotating an orientation direction. (3) When the positioning response packet is detected while the orientation direction rotates once, the orientation direction at the time of detection is set as a direction of a transmission source terminal of the positioning response packet. Here, the positioning packet received from the terminal which has been already detected is ignored. (4) When the positioning response packet is not detected even though the orientation direction has rotated once and the positioning packet has been omnidirectionally transmitted, the noise level is reduced by a predetermined level. Thereafter, until the positioning response packet is detected or the noise level reaches a predetermined lower limit, the procedure from (2) to (4) is repeated. By employing the above described procedure, it is possible to adaptively set the appropriate noise level responding to the actual communication environment.

Returning to FIG. 8, among the 12 positioning request packets omnidirectionally transmitted from the wireless terminal I, some packets directed toward the terminals A to C are received by the respective terminals. When it is detected that the received packets are the positioning notification packets, the receiving unit 20 of each terminal transmits the received packets to the positioning packet analyzing unit 84. The positioning packet analyzing unit 84 transmits the direction IDs included in the positioning request packets transmitted from the terminal I to the positioning packet generating unit 82 and requests the positioning packet generating unit 82 to transmit the positioning response packet.

On this point, a description is made using the terminal C as an example. The positioning packet generating unit 82 of the terminal C generates the positioning response packet c in which its own terminal ID is associated with the "direction ID" included in the positioning request packet c and requests the TDMA control unit 30 to transmit the positioning response packet c. The TDMA control unit 30 controls the SDM transmitting unit 10 such that the positioning response packet c is transmitted. At this time, unlike the case of the positioning request the SDM transmitting unit 10 omnidirectionally transmits the positioning response packet c using only one system adjusted to non-directivity.

Meanwhile, the receiving unit 20 of the terminal I receives the positioning response packets c, a, and b from the other terminals C, A, and B. When it is detected that the received packets are the positioning notification packets, the receiving unit 20 of the terminal I transmits the received packets to the positioning packet analyzing unit 84. The positioning packet analyzing unit 84 analyzes whether or not the terminal IDs included in the positioning response packets c, a, and b are identical to its own terminal ID. As a result, when it is analyzed that the terminal IDs are identical to its own terminal ID, the positioning packet analyzing unit 84 acquires sets of the direction IDs and the terminal IDs included in the positioning response packets (for example, "ID=aaa/ID=001", "ID=bbb/ID=004", and "ID=ccc/ID=010"); and sets the values to the adjustment parameter setting table 500 of the antenna directivity control unit 60b.

As a result of performing a series of processes using the positioning packet, as illustrated in FIG. 9, the adjustment parameters "DATA1", "DATA4", and "DATA10" are set to the adjustment parameter setting table 500 included in the antenna directivity control unit 60b of the terminal I in association with the "ID of the terminal A", the "ID of the terminal 2", and the "ID of the terminal C", respectively. The set values are retained until a next process is executed, and the table 500 is overwritten with a new value at the time of the next process. An update process of the adjustment parameter is preferably periodically executed at appropriate time intervals.

As described above, according to the first and second embodiments, when data is transmitted, the SDM transmitting unit 10 acquires the adjustment parameter corresponding to the terminal ID by referring to the adjustment parameter setting table 500 as necessary based on the transmission destination terminal ID included in the packet and executes high frequency (RF) beam formation based on the adjustment parameter. As a result, even when the mobile has moved within the network, an appropriate directional signal suitable for the current position of the mobile terminal is transmitted.

The exemplary embodiments of the present invention have been described above, but the present invention is not limited to the above embodiments. For example, a carrier sense multiple access with collision avoidance (CSMA/CA) scheme used in a wireless local area network (WLAN) may be employed as a TDMA control scheme for implementing the TDMA control unit, and the present invention may be developed to a wireless terminal which complies with a MAC protocol of the IEEE 802.11 (WLAN) standard. In addition, a range of an embodiment which can be expected by a person having ordinary skill in the art is included in the scope of the present invention unless there is an effect of the present invention.

Each of the functions of the above described embodiments can be implemented by a device executable program stated in a legacy programming language or an object-oriented programming language such as assembly language, C, C++, Visual C++, Java (a registered trademark), Java (a registered trademark) Beans, Java (a registered trademark) Applet, Java (a registered trademark) Script, Perl, and Ruby.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A wireless communication system comprising:
a plurality of wireless terminals that configure an equally distributed network having no base station, wherein each of the wireless terminals includes:
a space division multiplexing (SDM) transmitting unit that includes an array antenna including a plurality of antennas and generates a plurality of directional radio signals to be transmitted to other terminals within the network, each of the directional radio signals being obtained by superimposing a plurality of radio signals at the antennas, each of the radio signals at the antennas being composed of modulated data for each of the other terminals;
a single-system receiving unit; and
a time division multiple access (TDMA) control unit that controls a transmission operation of the SDM transmitting unit and a reception operation of the receiving unit in a time division manner, and
using a TDMA scheme, the wireless terminals are controlled in such a manner that any one of the wireless terminals acquires a transmission right for a predetermined time period to simultaneously transmit the generated directional radio signals from the SDM transmitting unit, while during the predetermined time period, the receiving units of the other wireless terminals having no transmission right simultaneously receive their corresponding directional radio signals which are different from each other.

2. The wireless communication system according to claim 1, wherein each of the wireless terminals includes:
a terminal direction measuring unit that periodically measures directions of the other terminals within the network; and
an antenna directivity control unit that controls the transmission operation of the SDM transmitting unit such that directivity of each of the directional radio signals matches the direction of each of the other terminals, and
the antenna directivity control unit includes:
an adjustment parameter reference table that stores therein adjustment parameters respectively corresponding to directions; and
an adjustment parameter setting table that manages the adjustment parameters in association with terminal IDs, and
the SDM transmitting unit executes a transmission operation of the directional radio signals using the adjustment parameters associated with the terminal IDs.

3. The wireless communication system according to claim 2, wherein the terminal direction measuring unit
requests the SDM transmitting unit and the receiving unit to transmit and receive a non-directional distance measurement packet between an own terminal and the other terminals within the network,
calculates and acquires separation distances between the own terminal and the other terminals within the network based on a time taken between transmission of a distance measurement request packet and reception of a distance measurement response packet,
acquires separation distances calculated by the terminal direction measuring units of the other terminals within the network from the other terminals,
calculates a direction of each of the other terminals within the network by performing a calculation using a principle of trilateration based on all of the acquired separation distances, and
notifies the antenna directivity control unit of the calculated directions associated with the terminal IDs of the other terminals, and
the antenna directivity control unit sets adjustment parameters respectively corresponding to the notified directions to the adjustment parameter setting table with reference to the adjustment parameter reference table.

4. The wireless communication system according to claim 2, wherein the terminal direction measuring unit requests the SDM transmitting unit to transmit a directional positioning request packet including a direction ID indicating a direction and requests the receiving unit to receive positioning response packets each including the terminal ID of the corresponding terminal and the direction ID from the other terminals within the network which have received the positioning request packet, and
the antenna directivity control unit sets an adjustment parameter corresponding to the direction indicated by the direction ID included in the positioning response packet to the adjustment parameter setting table with reference to the adjustment parameter reference table.

5. The wireless communication system according to claim 4, wherein the SDM transmitting unit superimposes a non-directional noise signal on a signal of the directional positioning request packet and transmits the superimposed signal.

6. The wireless communication system according to claim 2, wherein the terminal direction measuring unit
requests the SDM transmitting unit to superimpose a noise signal having a null point in a specific direction on a signal of a non-directional positioning request packet including a direction ID indicating a direction to thereby transmit the superimposed signal,
requests the receiving unit to receive positioning response packets including the terminal ID of the corresponding terminal and the direction ID from the other terminals that has received the positioning request packet, and
the antenna directivity control unit sets an adjustment parameter corresponding to the direction indicated by the direction ID included in the positioning response packet to the adjustment parameter setting table with reference to the adjustment parameter reference table.

7. The wireless communication system according to claim 1, wherein the receiving unit shares the array antenna with the SDM transmitting unit and controls a directivity characteristic of the array antenna at the time of wireless reception to be an isotropic characteristic.

8. The wireless communication system according to claim 1, wherein a time division multiple access (TDMA) or a carrier sense multiple access with collision avoidance (CSMA/CA) is used as the TDMA scheme.

9. A wireless terminal that configures an equally distributed network having no base station, comprising:
a space division multiplexing (SDM) transmitting unit that includes an antenna array including a plurality of antennas and generates a plurality of directional radio signals to be transmitted to other terminals within the network, each of the directional radio signals being obtained by superimposing a plurality of radio signals at the antennas, each of the radio signals at the antennas being composed of modulated data for each of the other terminals;
a single-system receiving unit; a time division multiple access (TDMA) control unit that controls a transmission operation of the SDM transmitting unit and a reception operation of the receiving unit in a time division manner;
a terminal direction measuring unit that periodically measures directions of the other terminals within the network; and
an antenna directivity control unit that controls the transmission operation of the SDM transmitting unit such that directivity of each of the directional radio signals matches the direction of each of the other terminals,
wherein the antenna directivity control unit includes:
an adjustment parameter reference table that stores therein adjustment parameters respectively corresponding to directions; and
an adjustment parameter setting table that manages the adjustment parameters in association with terminal IDs; and
the SDM transmitting unit executes a transmission operation of the directional radio signals using the adjustment parameters associated with the terminal IDs.

10. The wireless communication device according to claim 9, wherein the terminal direction measuring unit
requests the SDM transmitting unit and the receiving unit to transmit and receive a non-directional distance measurement packet between an own terminal and the other terminals within the network, calculates and acquires separation distances between the own terminal and the other terminals within the network based on a time taken between transmission of a distance measurement request packet and reception of a distance measurement response packet, acquires the separation distances calculated by the terminal direction measuring units of the other terminals within the network from the other terminals, calculates the direction of each of the other terminals within the network by performing a calculation using a principle of trilateration based on all of the acquired separation distances, and notifies the antenna directivity control unit of the calculated directions associated with the terminal IDs of the other terminals, and the antenna directivity control unit sets the adjustment parameters respectively corresponding to the notified directions to the adjustment parameter setting table with reference to the adjustment parameter reference table.

11. The wireless communication device according to claim 9, wherein the terminal direction measuring unit requests the SDH transmitting unit to transmit a directional positioning request packet including a direction ID indicating a direction and requests the receiving unit to receive positioning response packets each including the terminal ID of the corresponding terminal and the direction ID from the other terminals within the network which have received the positioning request packet, and the antenna directivity control unit sets an adjustment parameter corresponding to the direction indicated by the direction ID included in the positioning response packet to the adjustment parameter setting table with reference to the adjustment parameter reference table.

12. The wireless communication device according to claim 11, wherein the SDM transmitting unit superimposes a non-directional noise signal on a signal of the directional positioning request packet and transmits the superimposed signal.

13. The wireless communication device according to claim 9, wherein the terminal direction measuring unit requests the SDM transmitting unit to superimpose a noise signal having a null point in a specific direction on a signal of a non-directional positioning request packet including a direction ID indicating a direction to thereby transmit the superimposed signal, requests the receiving unit to receive positioning response packets including the terminal ID of the corresponding terminal and the direction ID from the other terminals that has received the positioning request packet, and the antenna directivity control unit sets an adjustment parameter corresponding to the direction indicated by the direction ID included in the positioning response packet to the adjustment parameter setting table with reference to the adjustment parameter reference table.

14. A method executed by a computer of operating a wireless communication device that configures an equally distributed network having no base station, the method comprising:

simultaneously transmitting, by the wireless communication device, a plurality of directional radio signals each obtained by superimposing a plurality of radio signals at antennas, each of which is composed of modulated data for each of other wireless communication devices, to the other wireless communication devices within the network according to a space division multiplexing scheme;

receiving radio signals transmitted from the other wireless communication devices within the network by a single-system receiving unit of the wireless communication device;

controlling, by the wireless communication device, an operation of transmitting the directional radio signal and an operation of receiving the radio signal in a time division manner;

periodically measuring, by the wireless communication device, directions of the other wireless communication devices within the network;

acquiring, by the wireless communication device, adjustment parameters respectively corresponding to the measured directions of the other wireless communication devices with reference to an adjustment parameter reference table storing therein adjusting parameters respectively corresponding to directions; and generating, by the wireless communication device, the directional radio signals to be transmitted to the other wireless communication devices using the adjustment parameters.

15. A computer program product comprising a non-transitory computer-readable medium including programmed instructions, wherein the instructions, when executed by a computer, cause the computer to execute the method according to claim 14.

16. A digital circuit for executing the method according to claim 14.

* * * * *